United States Patent
Ginzburg et al.

(10) Patent No.: US 9,001,138 B2
(45) Date of Patent: Apr. 7, 2015

(54) 2-D GATHER INSTRUCTION AND A 2-D CACHE

(75) Inventors: Boris Ginzburg, Haifa (IL); Oleg Margulis, Haifa (IL)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 13/220,402

(22) Filed: Aug. 29, 2011

(65) Prior Publication Data

US 2013/0054899 A1 Feb. 28, 2013

(51) Int. Cl.
*G09G 5/36* (2006.01)
*G06T 1/60* (2006.01)
*G06F 12/08* (2006.01)

(52) U.S. Cl.
CPC .............. *G06T 1/60* (2013.01); *G06F 12/0875* (2013.01)

(58) Field of Classification Search
CPC ............ G06F 12/0875; G06F 12/0862; G06F 12/0864; G06F 12/0207; G06F 2212/6026; G06F 2212/6028
USPC .................................................. 345/556–557
See application file for complete search history.

(56) References Cited

U.S. PATENT DOCUMENTS

| | | | |
|---|---|---|---|
| 6,571,320 B1 * | 5/2003 | Hachmann | 711/141 |
| 6,907,438 B1 | 6/2005 | Horton et al. | |
| 7,028,168 B2 | 4/2006 | Wadleigh | |
| 7,649,538 B1 * | 1/2010 | Minkin et al. | 345/582 |
| 8,432,409 B1 * | 4/2013 | Dunlap et al. | 345/562 |
| 2003/0221089 A1 | 11/2003 | Spracklen | |
| 2010/0149202 A1 * | 6/2010 | Yoshikawa | 345/557 |
| 2010/0268884 A1 * | 10/2010 | Cummings et al. | 711/122 |
| 2011/0153707 A1 | 6/2011 | Ginzburg et al. | |

FOREIGN PATENT DOCUMENTS

WO 2013/032788 A2 8/2012

OTHER PUBLICATIONS

International Search Report and Written Opinion received for PCT Patent Application No. PCT/US2012/051748, mailed on Feb. 22, 2013, 10 pages.

* cited by examiner

*Primary Examiner* — Hau Nguyen
(74) *Attorney, Agent, or Firm* — Ryder, Lu, Mazzeo and Konieczny LLC; Douglas J. Ryder

(57) ABSTRACT

A processor may support a two-dimensional (2-D) gather instruction and a 2-D cache. The processor may perform the 2-D gather instruction to access one or more sub-blocks of data from a two-dimensional (2-D) image stored in a memory coupled to the processor. The two-dimensional (2-D) cache may store the sub-blocks of data in a multiple cache lines. Further, the 2-D cache may support access of more than one cache lines while preserving a two-dimensional structure of the 2-D image.

23 Claims, 5 Drawing Sheets

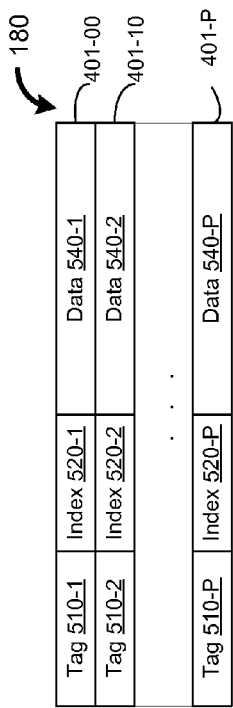
FIG. 5
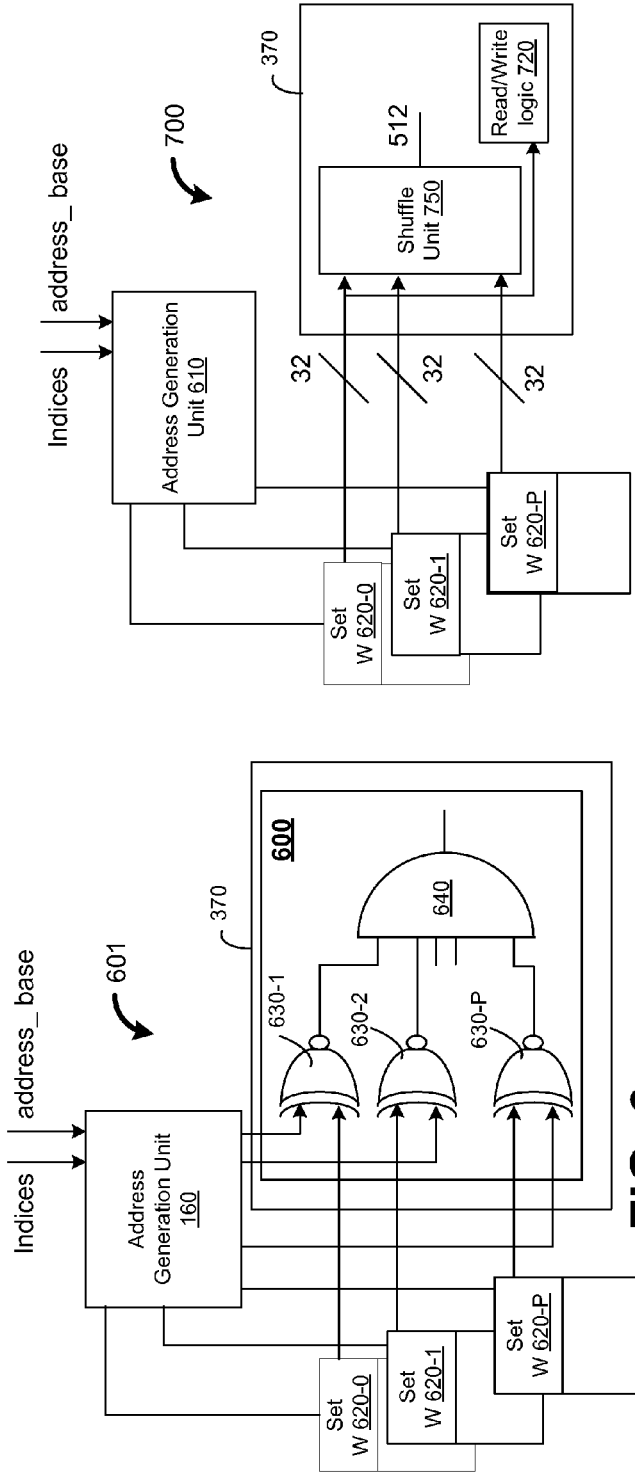
FIG. 7
FIG. 6

2-D GATHER INSTRUCTION AND A 2-D CACHE

BACKGROUND

As semiconductor technology continues to scale, more and more functionality is being integrated into the processors in particular. For example, such processors may be capable of performing graphics and media application in addition to performing the conventional tasks. Majority of media processing algorithms use "1D or 2-D region" variation of gather. While a gather loads row or line (1×m), column (m×1), or a matrix (m×n) (for example, (2×2), (4×4), or (8×2)), the generic vgather translates this "block load" into 16 offsets and the information in the image (row length) structure is lost.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates various fields in a data cache 180 according to one embodiment.

FIG. 6 illustrates a tag array logic to determine the appropriate data for each element in the cache according to one embodiment.

FIG. 7 illustrates a data array logic to arrange data in an order, which corresponds to the addresses in the gather instruction according to one embodiment.

DETAILED DESCRIPTION

Figure 1:
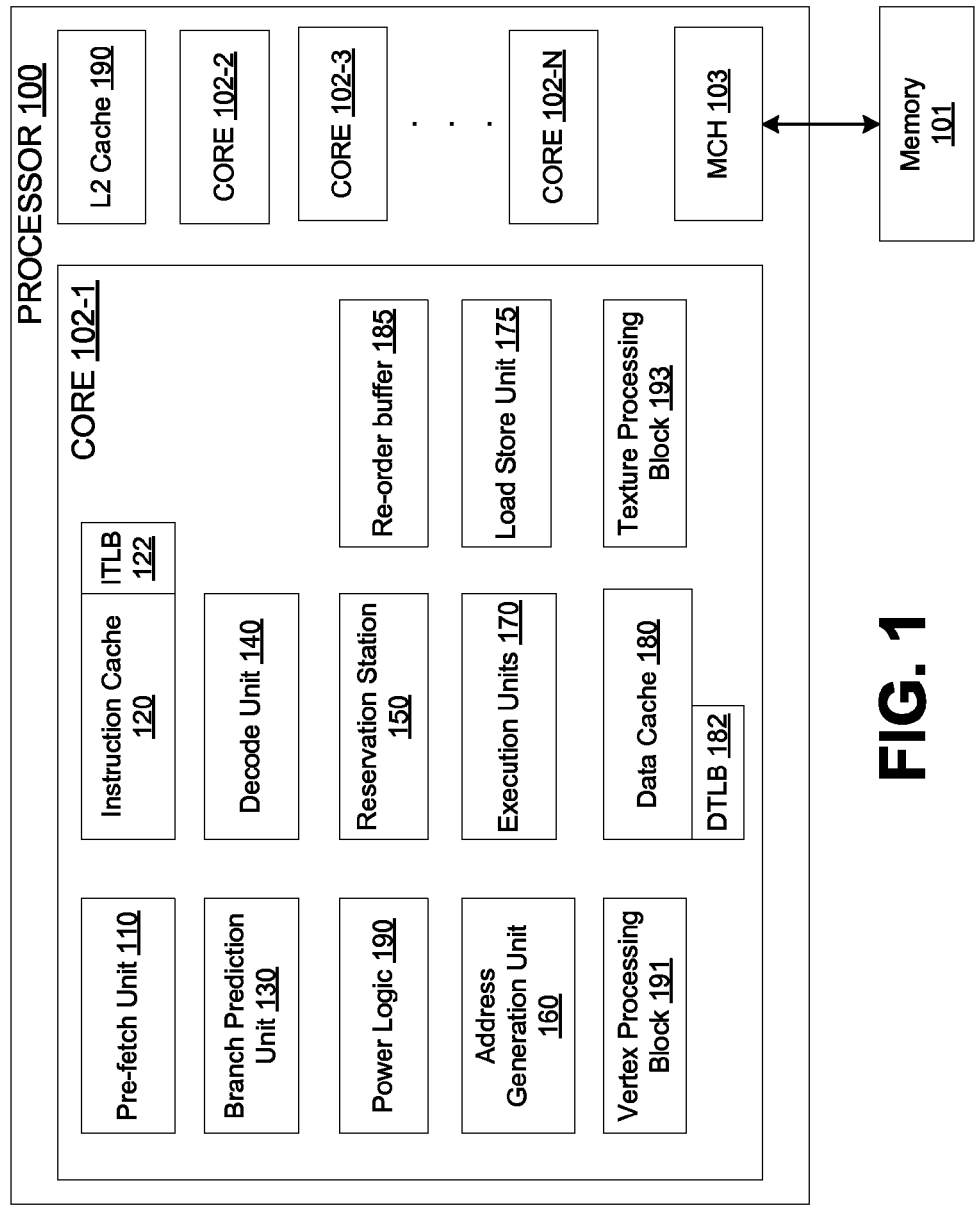
FIG. 1 illustrates a processor 100, which supports a 2-D cache and a 2-D gather instruction according to one embodiment.

The following description describes embodiments of a 2-D cache and a 2-D gather instruction. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the instruction set may comprise a special gather instruction, which may be referred to as a 2-D gather instruction. In one embodiment, the 2-D gather instruction may retain the two dimensional image structure or the image information related to the 2-D image structure. In one embodiment, the 2-D cache may use the image information for a special cache filling policy, which may result in a higher gather performance and low latency as compared to a generic gather instruction. A generic gather may load (or block load) up to 2 or 4 double precision floating point values from the memory address and the generic vgather translates the "block load" into 16 offsets and the information on image structure (i.e, row length) is lost.

To overcome the above disadvantage of the losing the image structure, in one embodiment, the 2-D instruction, which may retain the image and region parameters is disclosed. In one embodiment, the 2-D gather instruction may perform double stride gather, which may load the 2-D region such as (1×16, 2×8, 4×4; 8×2; or 16×1) from the 2D image.

In one embodiment, the 2-D cache is based on the idea of 2-D locality. In one embodiment, if a program loads some pixel (x, y) from an image 'A' stored in a memory, then there may be a high likely-hood that the pixels around the pixel (x,y) may be used soon. Also, there may be a high likely-hood that the pixels around the pixel (x,y) may be used multiple times. In one embodiment, to take advantage of the 2-D locality, a number of small rectangular windows 'W' of the large image in the memory may be maintained in the cache.

In one embodiment, a 2-D cache fill policy may be used to fill the cache with the image information stored in the memory. In one embodiment, the 2D window 'W' (i.e., image information) may be mapped on to a 2-D cache so as to avoid possible read conflicts for the 2-D region loads (for example, (1×16), (2×8), (4×4); (8×2); or (16×1)). In one embodiment, the image element (x, y) may be mapped on to the set and way of the cache, respectively, based on the following Equations (1) and (2) below:

$$\text{Set} = X \bmod \text{Num\_of\_Sets} \quad \text{Equation (1)}$$

$$\text{Way} = Y \bmod \text{Num\_of\_Ways} \quad \text{Equation (2)}$$

wherein 'mod' represents a modulo operator, which determines a reminder of a division of one number by the other.

In one embodiment, the 2-D cache lookup may include two tasks—1) to identify the location in the cache comprising the correct data; and 2) to arrange the data in an order, which may correspond to the order of the addresses in the 2-D gather instruction. In one embodiment, the location in the cache (comprising the correct data) may be identified by comparing the address generated by the address generation unit with the tag associated with each set. In one embodiment, the data in the identified locations may be arranged in an order to correspond to an order of the addresses in the 2-D gather instruction.

An embodiment of a processor 100, which may support a 2-D cache and a 2-D gather instruction is illustrated in FIG. 1. In one embodiment, the processor 100 may comprise a plurality of cores such as the cores 102-1 to 102-N, a L2 cache 190, and a memory controller hub (MCH) 103. In one embodiment, the core 102-A may comprise a pre-fetch unit 110, an instruction cache 120, an instruction translational look-aside buffer (ITLB) 122, a branch prediction unit 130, a decode unit 140, a reservation station 150, an address generation unit 160, execution units 170, a load and store unit (LSU) 175, a data cache 180, a data translational look-aside buffer (DTLB) 182, a re-order buffer 185, a vertex processing block 191 and a texture processing block 193. The other cores 102-2 to 102-N may include similar blocks as that of the core 102-1.

In one embodiment, the pre-fetch unit 110 may fetch instructions from the memory 101 while the others instructions, which were fetched earlier are being executed. The instructions so fetched may be stored in the instruction cache 120. The instruction translational look-aside buffer (ITLB) 122 may be used to translate the virtual address to a physical address. The instructions are then provided to the decode unit 140, which may decode the macro instructions into multiple micro-operations. The micro-operations may be then sent to reservation station 150, which may dispatch the micro-operations (uops) to the one or more of the execution units 170, the vertex processing block 191 or the texture processing block 193. In one embodiment, the instructions may be dispatched to one of the units 170, 191, or 193 based on the type of the instruction. For example, if the processing relates to graphics data the instruction may be performed by the vertex processing block 191 and the texture processing block 193 and by the execution unit 170 if it is non-graphics data. In one embodiment, the instructions may be performed in an out-of-order fashion and the re-order buffer 185 may store the results of such execution in an order to retain the original program order.

In one embodiment, the 2-D gather instruction, which may be used to load the 2-D region from the 2-D image to the data cache 180 may be as given by Equation (3) below. An example 2-D gather instruction may be as given below:

$$Zmm1 = \text{2-D\_gather\_16}(p\text{Image, rowWidth, block}X, \text{block}Y, \text{block}W, \text{block}H, \text{stride}X, \text{stride}Y);$$

wherein
pImage—is a pointer to image;
rowwidth—number of elements in the row;

blockX—X coordinate of the left upper corner of the block;
blockY—Y coordinate of the left upper corner of the block;
blockW—number of elements in the row of the block;
strideX—horizontal stride (optional, default=1); and
strideY—vertical stride (optional, default=1).

Structurally, the 2-D gather instruction may have some similarity with the generic vgather instruction, which may be as given in the Equation (4) below:

$$Zmm1 = v\text{gather}(p\text{Base, offset0, } \ldots \text{ offset 15}) \quad \text{Equation (4)}$$

wherein

```
pBase = [pImage + (rowWidth * (blockY-1) + blockX) + sizeofElem];
i = 0;
for (y=0; y < blockH; y++)
    for (x=0; x < blockY; x++) {
    offset [i] = (x + y * rowWidth) * sizeofElem;
    i ++;}
```

Further, the 2-D cache structure, the 2-D cache filling policy, and the 2-D cache look-up are described in detail below with reference to FIGS. 2-7.

Figure 2:
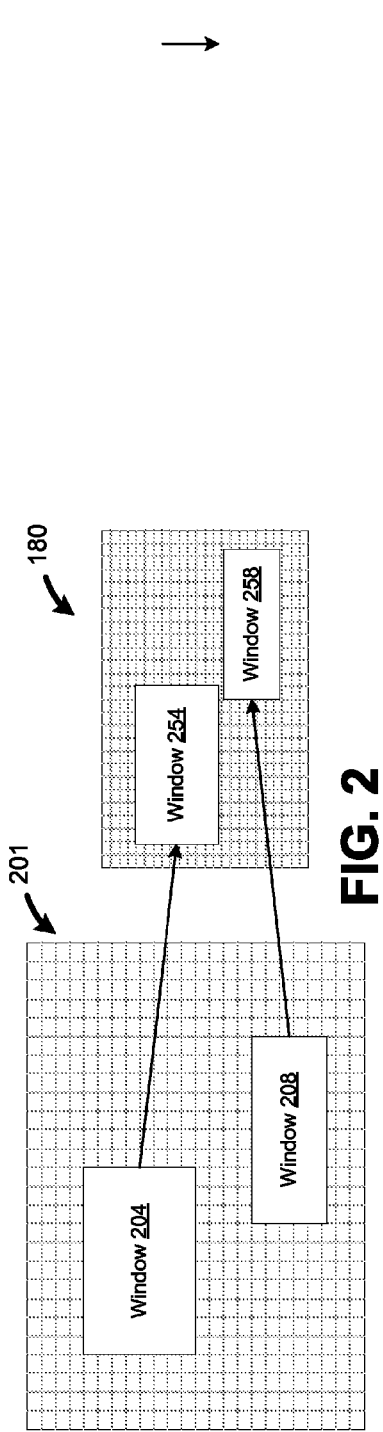
FIG. 2 illustrates a 2-D cache, which may store the image information stored in a memory according to one embodiment.

FIG. 2 illustrates a cache comprising one or more small windows of image information of an image stored in the memory according to one embodiment. In one embodiment, the image 201, stored in the memory 101, may be divided into a number of windows such as windows 204 and 208. In one embodiment, the windows 204 and 208 may be stored in the cache 180, respectively, as windows 254 and 258. In one embodiment, if the program or an instruction loads a pixel (x,y) from the image 201 there appears to be a high likelyhood that the neighboring pixels around the pixel (x,y) may be used soon after the pixel (x,y) is processed. Also, there appears to be a high likely-hood that the neighboring pixels may be used many times after processing the pixel (x,y). In one embodiment, the high likely-hood of neighboring pixels being used soon after processing the pixel (x,y) and then using the neighboring pixels multiple times soon after that may be referred to as "2-D locality".

Figure 3:
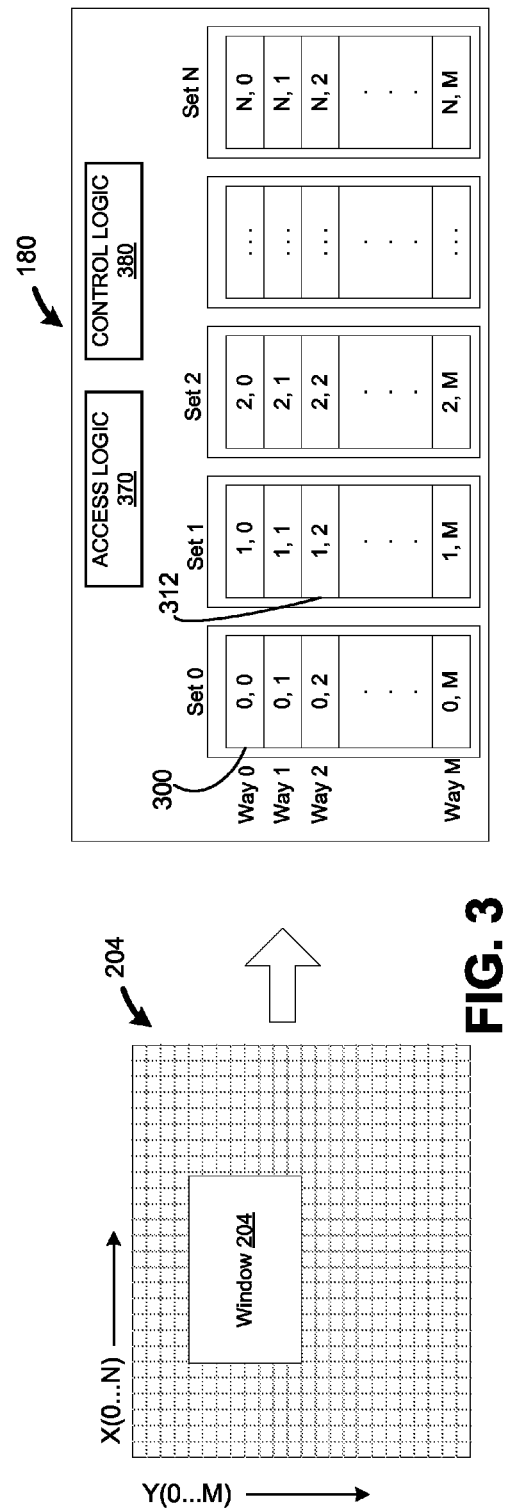
FIG. 3 illustrates the 2-D cache, which may be represented as a combination of sets and ways according to one embodiment.

FIG. 3 illustrates the 2-D cache, which may be represented as a combination of sets and ways according to one embodiment. In one embodiment, the 2-D cache 180 may include an access logic 370, a control logic 380, and a multiple memory blocks arranged in the form of columns (sets) and rows (ways). In one embodiment, the access logic 370 may support cache filling and 2-D cache look-up tasks described below. In one embodiment, the control logic 380 may initiate the access logic 370 to perform cache filling and 2-D cache look-up while the 2-D gather instruction may be performed by the execution unit 170.

In one embodiment, the 2-D cache 180 may be viewed as a combination of multiple memory blocks each of which may be uniquely identified by a combination of the identifier of a set and a way. In one embodiment, the 2-D cache 180 may include N sets (set 0 to set N) and M ways (way 0 to way M). In one embodiment, each memory block within the 2-D cache uniquely identified by the identifier of the way and the set.

In one embodiment, the 2-D cache may be viewed as a sliding window that may slide over the windows (i.e., a group of pixels) in the image stored in the memory 101. In one embodiment, the 2-D cache 180 may store image information of one or more windows such as 204 and 208. In one embodiment, during a first time point the 2-D cache 180 may store the pixels covered by the windows 204 and 208 in the sets and ways. In other embodiment, the 2-D cache 180 may store the pixels covered by the windows 204 and then slide to cover the pixels of the window 208.

Like-wise, the 2-D cache 180 may store pixels covered by a first set of windows and then slide to store the pixels covered by the second set of windows. In one embodiment, the pixels in the window 204 in the main memory 101 may be mapped into memory blocks in the 2-D cache 180 and each memory block may be identified by a unique combination of the set number and the way number. For example, the memory block 300 may be uniquely identified by a combination of set number (N=0) and a way number (M=0). Similarly, the memory block 312 may be uniquely identified by a combination of set number (N=1) and the way number (M=2).

In one embodiment, the 2-D cache 180 may adopt a 2-D cache filling policy to fill the memory blocks within the 2-D cache 180. In one embodiment, the 2-D cache includes N sets and M ways and is two dimensional. In one embodiment, the 2-D window 'W' such as 204 and/or 208 in the memory 180 may be mapped on to 2-D cache 180 so as to avoid possible read conflicts for the 2-D region loads (for example, (1×16), (2×8), (4×4); (8×2); or (16×1)). In one embodiment, the image element (x, y) may be mapped on to the set and way of the cache, respectively, based on the Equations (1) and (2) above. For example, the mapping or cache filling may be implemented as Set=address [6 . . . 11] and way=Row mod Num_of_Ways.

Figure 4:
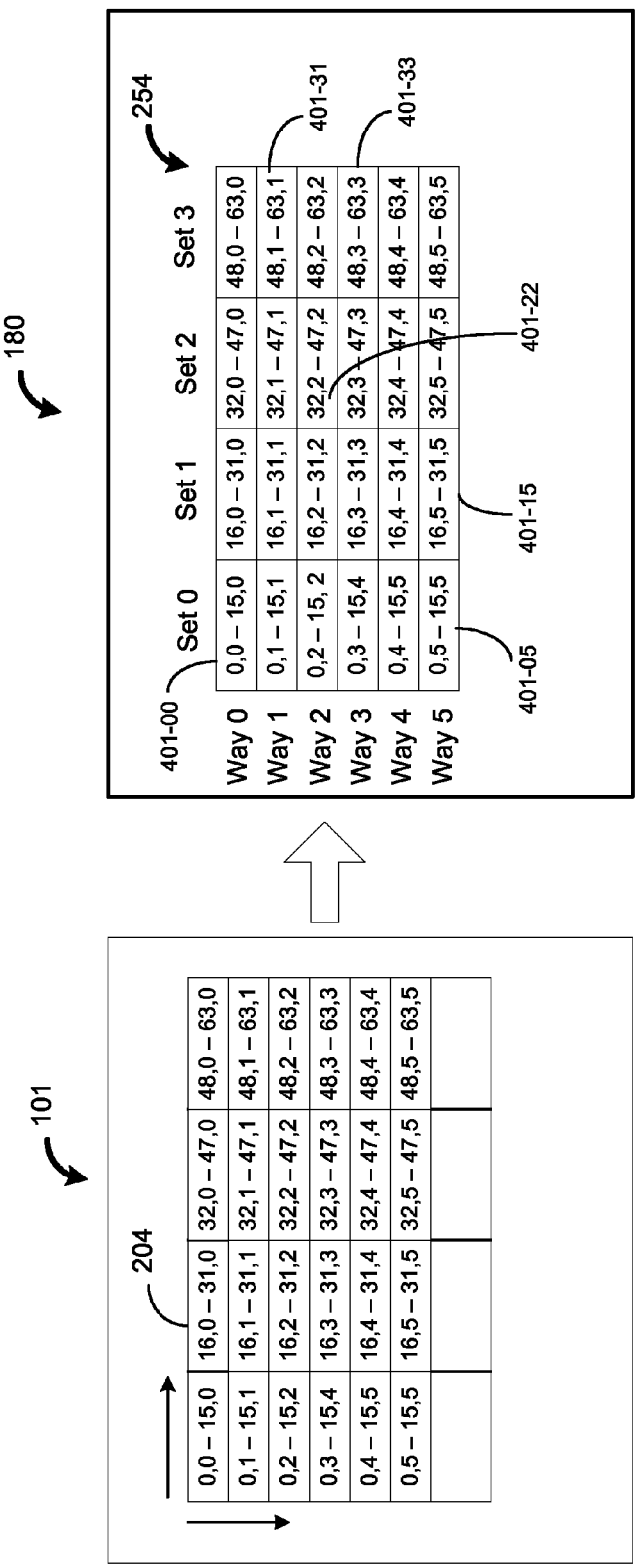
FIG. 4 illustrates a mapping of the image information (or elements x, y) to (set, way) in the 2-D cache according to one embodiment.

For a 2-D cache with 32 ways, the above example of filling the cache may result in a cache filling depicted in FIG. 4. In one embodiment, the window 204 may be may be mapped (or cache filled) to the 2-D cache 180. For example, the pixels within the coordinates [(0,0)-(15,0)] in the image 204 may be mapped to a memory block 401-00 in the 2-D cache 180 and the pixels within the coordinates [(48,1)-(63,1)] of the image 204 may be mapped to a memory block 401-31 in the 2-D cache 180. Similarly, the pixels within the coordinates [(32, 2)-(47,2)], [(48,3)-(63,3)], [(0,5)-(15,5)], and [(16,5)-(31,5)] of the image 204 may be mapped to the memory blocks 401-22, 401-33, 401-05, and 401-15, respectively. In one embodiment, the 2-D image may be, directly, loaded on to the 2-D cache 180. As the 2-D image may be mapped (or loaded) into the 2-D cache 180, directly, from the memory 101, the need for an intermediate 2-D register file (RF) or a 2-D scratch pad, which may require explicit pre-load may be avoided.

In one embodiment, the mapping of the two-dimensional (2-D) image using the 2-D gather instructions allows for a maximum of 2 iterations. For example, the 2-D gather instruction may gather data from a line (1×16), column (16× 1), matrices (8×2), (4×4), and (2×8) and the maximum iterations involved may be equal to 2, 1, 2, 2, and 2 processing cycles, respectively.

FIG. 5 illustrates various fields of the 2-D cache according to one embodiment. In one embodiment, each memory block such as 401-00 to 401-NM may include various fields such as tag (510-1 to 510-M), index (520-1 to 520-M), and data (540-1 to 540-M). In one embodiment, the tags 510-1 to 510-M may be used to determine an appropriate data for each element in the 2-D cache 180 after comparing the address provided by the address generation unit 160 with the tags 510-1 to 510-M.

FIG. 6 illustrates an arrangement 601, which may determine one or more memory blocks that may be available for filling the image information according to one embodiment. In one embodiment, the arrangement 601 may include the address generation unit 160, sets and ways including memory blocks 620-1 to 620-P, and a tag array logic 600. In one embodiment, the tag array logic 600 may be included in the access logic 370 of FIG. 3 and the tag array logic 600 may operate with the address generation unit 160 to determine the one or more memory blocks that may be available for filling the image information. In one embodiment, the tag array 600 may include multiple X-NOR gates 630-1 to 630-P and the output of the X-NOR gates 630-1 to 630-P may be provided as an input to the P-input AND gate 640.

In one embodiment, the address generation unit 160 may generate an address A1 and at least some of the bits (a1, a2, a3, . . . ak) of the address A1 may be provided as a first input to the logic X-NOR gates 630-1 to 630-P. In one embodiment, the bits in the tag may be provided as a second input to the X-NOR logic gates 630-1 to 630-P. In one embodiment, if there is a position-wise match in the bits in the tag with the bits in the address (i.e., if the bit values provided to the ex-Nor are the same), the output generated by each of the X-NOR gate 630-1 to 630-P may be logic 1. In one embodiment, if the output of all the X-NOR gates 630-1 to 630-P are equal to 1, the output generated by the AND gate 640 may be equal to logic 1 as well. In one embodiment, the tag array 600 may thus determine the memory block, which includes a tag that is equal to the address generated by the address generation unit 610.

FIG. 7 illustrates an arrangement 700, which may be used to arrange the data stored in the memory blocks to be arranged in an order corresponding to the order of the addresses accessed by performing the 2-D gather instruction according an embodiment. In one embodiment, the arrangement 700 may include the address generation unit 160, the sets and ways including the memory blocks 620-1 to 620-P, and the access logic 370 including a read/write logic 720 and a shuffle unit 750. In one embodiment, the 2-D cache look-up may be performed based on a technique, which may be referred to as 'direct map with tag comparison per way'. In one embodiment, such a technique may include identifying the memory blocks, which may be uniquely identified by a set and a way of the 2-D cache 180, retrieve the content of the tag field, and determine if the data stored in the memory block identified by a unique combination of set and way is evicted or replaced. In one embodiment, a memory block such as 300 or 312 or 401-00, 401-05, 401-15, 401-22, 401-31, or 401-33 may be identified as described above with reference to FIG. 6.

After identifying the memory blocks such as 401-00, 401-05, 401-15, 401-22, 401-31, or 401-33, the content or the image information in the memory blocks may be provided to the read/write logic 720 and the shuffle unit 750. In one embodiment, the read/write logic 720 may access the tag portions of the memory blocks 401-00, 401-05, 401-15, 401-22, 401-31, or 401-33 and determine if the tags are still relevant (i.e., not evicted or replaced). In one embodiment, the shuffle unit 750 may rearrange the data in the non-evicted memory blocks in an order of the addresses provided by the 2-D gather instruction.

In one embodiment, the access logic 370 may access more than one cache lines, which may include non-evicted data. In one embodiment, the 2-D cache 180 may support access of up to 16 separate cache lines per single processing cycle unlike the prior art caches, which may allow one cache line to be accessed per processing cycle. In one embodiment, the data stored in the relevant memory blocks within these cache lines may be extracted by the access logic 370 and arranged by the shuffle unit 750 to generate the 2-D gather data. As a result, the 2-D cache 180 may access more than one ways per port, for example if multiple elements may be stored in the same physical bank but, within different sets. In one embodiment, the cache filling technique and the 2-D gather technique described above may minimize bank conflicts during the 2-D region loads.

The operation of the 2-D gather instruction and the 2-D cache is described with reference to the 2-D data cache 180, for example. However, the techniques described above may be performed in other caches such as L2 cache 190 or any other cache or any other memory as well.

Figure 8:
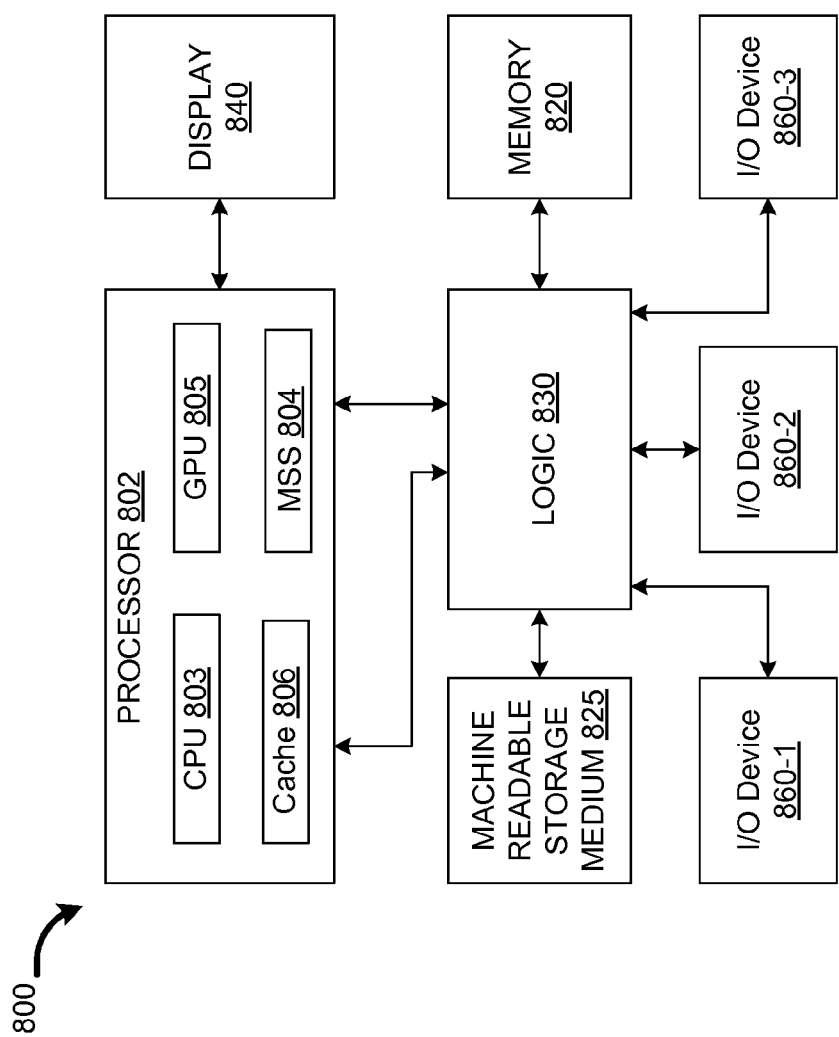
FIG. 8 is a computer system, which may support 2-D gather instruction and a 2-D cache according to one embodiment.

FIG. 8 is a computer system, which may support 2-D gather instruction and a 2-D cache according to one embodiment. In one embodiment, the computer system 800 may comprise a processor 802, which may include a single instruction multiple data (SIMD), reduced instruction set (RISC), and such other similar general purpose central processing unit 803 and a graphics processor unit (GPU) 805 and a cache 806. The processor 802, in one embodiment, may store a sequence of instructions, to provide and process the data bits to perform multi-bit error correction in machine readable storage medium 825. However, the sequence of instructions may also be stored in the memory 820 or in any other suitable storage medium. The processor 802 is shown to include the CPU 802 and GPU 805, however, other embodiments are possible. One such embodiment may include the processor 802 comprising multiple cores, wherein each core may be capable of performing the functions of both the CPU and the GPU. In other embodiment, the CPU 802 and GPU 805 may be fabricated on a single die. In yet another embodiment, the CPU 802 and the GPU 805 may be fabricated on separate dies. Such other embodiments may support the 2-D gather instruction and the 2-D cache as well.

The processor 802 that operates the computer system 800 may be one or more processor cores coupled to logic 830. In one embodiment, the processor 810 may comprise a central processing unit 803 and a memory subsystem MSS 804. In one embodiment, the CPU 802 or the GPU 803 may perform the 2-D gather instruction describe above and the cache 806 may support the 2-D cache structure, 2-D cache filling, and the 2-D gather techniques described above.

The logic 830, for example, could be chipset logic in one embodiment. The logic 830 is coupled to the memory 820, which can be any kind of storage, including optical, magnetic, or semiconductor storage. The I/O devices 860 may allow the computer system 800 to interface with the devices such as network devices or users of the computer system 800.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
a pre-fetch unit to fetch one or more instructions,
a decode unit to decode the one or more instructions, wherein the one or more instructions include a two-dimensional (2-D) gather instruction,
an execution unit to perform the 2-D gather instruction to access one or more sub-blocks of data from a two-dimensional (2-D) image stored in a memory coupled to the processor, and
a two-dimensional (2-D) cache to store the one or more sub-blocks of data in multiple cache lines, to support access to more than one cache line in a single processing cycle, to preserve a two-dimensional structure of the 2-D image, and to support mapping of the one or more sub-blocks to avoid read conflict after loading the one or more sub-blocks, wherein the 2-D cache includes
a plurality of sets and a plurality of ways, and
an access logic to map the one or more sub-blocks on to the plurality of sets and the plurality of ways and to perform a 2-D cache lookup, wherein the cache lookup includes
identifying a memory block within the 2-D cache using the set and the way of the 2-D cache,
retrieving content of a tag field within the memory block, and
determining if a data stored in the memory block is evicted.

2. The processor of claim 1, wherein the execution unit is further to cause loading the one or more sub-blocks into the 2-D cache in response to performing the 2-D gather instruction.

3. The processor of claim 2, wherein the 2-D gather instruction is to specify a pointer to the 2-D image, a plurality of coordinates to identify the one or more sub-blocks, and a number of elements in the one or more sub-blocks.

4. The processor of claim 1, wherein the 2-D gather instruction is to cause access of sixteen cache lines in one processing cycle.

5. The processor of claim 1, wherein the access logic is to determine a set of the plurality of sets on to which a first coordinate of an image pixel of the one or more sub-blocks are mapped, wherein the set is determined using a result of a modulo operation performed on the first coordinate of the 2-D image and a total number of sets available in the 2-D cache.

6. The processor of claim 1, wherein the access logic is to determine a way of the plurality of ways on to which a second coordinate of the image pixel within the one or more sub-blocks are mapped, wherein the way is determined using a result of a modulo operation performed on the second coordinate of the 2-D image and a total number of ways available in the 2-D cache.

7. The processor of claim 1, wherein the access logic comprises a read/write logic to access the tag field from the memory block and determine if contents of the tag field is non-evicted.

8. The processor of claim 7, wherein the access logic further comprises a shuffle logic to rearrange the data in the memory blocks in an order of the addresses provided by the 2-D gather instruction, wherein the memory blocks associated with the tag field that are non-evicted are chosen.

9. A method in a processor comprising:
pre-fetching one or more instructions,
decoding the one or more instructions, wherein the one or more instructions include a two-dimensional (2-D) gather instruction,
performing the 2-D gather instruction to access one or more sub-blocks of data from a two-dimensional (2-D) image stored in a memory coupled to the processor,
storing the one or more sub-blocks of data in multiple cache lines of a 2-D cache, wherein the 2-D cache includes a plurality of sets and a plurality of ways,
supporting access to more than one cache line in a single processing cycle while preserving a two-dimensional structure of the 2-D image in the 2-D cache,
mapping the one or more sub-blocks in the 2-D cache to avoid read conflict after loading the one or more sub-blocks, wherein the mapping includes mapping the one or more sub-blocks on to the plurality of sets and the plurality of ways of the 2-D cache, and
determining a set of the plurality of sets on to which a first coordinate of an image pixel of the one or more sub-blocks are mapped, wherein the set is determined using a result of a modulo operation performed on the first coordinate of the 2-D image and a total number of sets available in the 2-D cache.

10. The method of claim 9, further comprising loading the one or more sub-blocks into the 2-D cache in response to performing the 2-D gather instruction.

11. The method of claim 10, further comprising
specifying a pointer to the 2-D image in response to execution of the 2-D gather instruction, and
identifying the one or more sub-blocks and a number of elements in the one or more sub-blocks using a plurality of coordinates.

12. The method of claim 9, further comprising accessing sixteen cache lines in one processing cycle in response to performing the 2-D gather instruction.

13. The method of claim 9, further comprising determining a way of the plurality of ways on to which a second coordinate of the image pixel within the one or more sub-blocks are mapped, wherein the way is determined using a result of a modulo operation performed on the second coordinate of the 2-D image and a total number of ways available in the 2-D cache.

14. The method of claim 9, further comprising performing a 2-D cache lookup, wherein the cache look-up includes,
identifying a memory block within the 2-D cache using the set and the way of the 2-D cache,
retrieving content of a tag field within the memory block, and
determining if a data stored in the memory block is evicted.

15. The method of claim 14, further comprising accessing the tag field from the memory block and determining if content of the tag field is non-evicted.

16. The method of claim 15, further comprising rearranging the data in the memory blocks in an order of the addresses provided by the 2-D gather instruction, wherein the memory blocks associated with the tag field that are non-evicted are chosen.

17. A system comprising,
a memory,
a machine readable storage medium,
a logic,
a plurality of input-output devices, and
a processor comprising a plurality of cores and a plurality of caches, wherein the plurality of caches includes a two-dimensional (2-D) cache, wherein the 2-D cache includes a plurality of sets and a plurality of way, and wherein the processor is to,
fetch one or more instructions,
decode the one or more instructions, wherein the one or more instructions include a two-dimensional (2-D) gather instruction,
perform the 2-D gather instruction to access one or more sub-blocks of data from a two-dimensional (2-D) image stored in a memory coupled to the processor,
store the one or more sub-blocks of data in multiple cache lines of the 2-D cache;
support access to more than one cache line of the 2-D cache in a single processing cycle while preserving a two-dimensional structure of the 2-D image,
support mapping of the one or more sub-blocks, in the 2-D cache, on to the plurality of sets and the plurality of ways of the 2-D cache to avoid read conflict after loading the one or more sub-blocks, and
determine a way of the plurality of ways on to which a second coordinate of the image pixel within the one or more sub-blocks are mapped, wherein the way is determined using a result of a modulo operation performed on the second coordinate of the 2-D image and a total number of ways available in the 2-D cache.

18. The system of claim 17, wherein the processor is further to load the one or more sub-blocks into the 2-D cache in response to performing the 2-D gather instruction.

19. The system of claim 18, wherein the processor is further to,
specify a pointer to the 2-D image in response to performing the 2-D gather instruction, and
identify the one or more sub-blocks and a number of elements in the one or more sub-blocks using a plurality of coordinates.

20. The system of claim 17, wherein the processor is to determine a set of the plurality of sets on to which a first coordinate of an image pixel of the one or more sub-blocks are mapped, wherein the set is determined using a result of a modulo operation performed on the first coordinate of the 2-D image and a total number of sets available in the 2-D cache.

21. The system of claim 17, wherein the processor is further to support performing a 2-D cache lookup, wherein the cache look-up includes,
identifying a memory block within the 2-D cache using the set and the way of the 2-D cache,
retrieving content of a tag field within the memory block, and
determining if a data stored in the memory block is evicted.

22. The system of claim 21, wherein the processor is further to support accessing the tag field from the memory block and determining if content of the tag field is non-evicted.

23. The system of claim 22, wherein the processor is further to support rearranging the data in the memory blocks in an order of the addresses provided by the 2-D gather instruction, wherein the memory blocks associated with the tag field that are non-evicted are chosen.

* * * * *